United States Patent
Kim (10) Patent No.: US 12,317,389 B2
(45) Date of Patent: May 27, 2025

(54) LAMP, METHOD FOR OPERATING THE SAME, VEHICLE

(71) Applicant: HYUNDAI MOBIS CO., LTD., Seoul (KR)

(72) Inventor: Myeong Je Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 151 days.

(21) Appl. No.: 17/652,859

(22) Filed: Feb. 28, 2022

(65) Prior Publication Data

US 2023/0164896 A1 May 25, 2023

(30) Foreign Application Priority Data

Nov. 24, 2021 (KR) .................. 10-2021-0163543

(51) Int. Cl.
*H05B 47/115* (2020.01)
*G06T 7/70* (2017.01)
*G06V 20/58* (2022.01)

(52) U.S. Cl.
CPC .............. *H05B 47/115* (2020.01); *G06T 7/70* (2017.01); *G06V 20/58* (2022.01); *G06T 2207/30252* (2013.01)

(58) Field of Classification Search
None
See application file for complete search history.

(56) References Cited

U.S. PATENT DOCUMENTS

| | | | |
|---|---|---|---|
| 10,083,361 B2* | 9/2018 | Schamp | G06V 10/145 |
| 10,654,401 B2 | 5/2020 | Hamada et al. | |
| 2006/0204037 A1* | 9/2006 | Watanabe | G06V 20/58 701/1 |
| 2007/0019432 A1 | 1/2007 | Shimada | |
| 2009/0322878 A1* | 12/2009 | Ishii | B60R 1/00 348/148 |
| 2014/0132707 A1* | 5/2014 | Hashimoto | H04N 13/239 348/36 |
| 2015/0002620 A1* | 1/2015 | Shin | B60W 30/095 348/148 |
| 2017/0039437 A1* | 2/2017 | Park | H04N 23/69 |
| 2018/0040130 A1* | 2/2018 | Pan | G06T 7/11 |
| 2019/0154439 A1* | 5/2019 | Binder | G01B 11/26 |
| 2020/0148203 A1* | 5/2020 | Taniguchi | G06T 1/00 |
| 2020/0320728 A1* | 10/2020 | Tsunashima | G01C 11/14 |
| 2020/0322585 A1* | 10/2020 | Tsunashima | G06T 7/593 |

(Continued)

FOREIGN PATENT DOCUMENTS

| DE | 10-2015-012020 | 3/2017 |
|---|---|---|
| JP | 2011-148372 | 8/2011 |

(Continued)

OTHER PUBLICATIONS

German Office Action dated Jun. 29, 2022 issued in DE 10-2022-107065.4.

(Continued)

*Primary Examiner* — Wilson Lee
(74) *Attorney, Agent, or Firm* — DLA PIPER LLP US (57) ABSTRACT

A lamp includes a sensor to sense a distance to an object in front of a vehicle, a display to display an image, and a controller to compensate for distortion of the image displayed on the object, based on the distance to the object.

11 Claims, 9 Drawing Sheets

(56) References Cited

U.S. PATENT DOCUMENTS

| | | | |
|---|---|---|---|
| 2020/0329215 A1* | 10/2020 | Tsunashima | G01C 3/14 |
| 2020/0361376 A1* | 11/2020 | Umezane | G06V 20/586 |
| 2021/0046862 A1* | 2/2021 | Wang | G06V 20/584 |
| 2021/0124367 A1* | 4/2021 | Lim | G01S 11/04 |
| 2022/0051435 A1* | 2/2022 | Higashibara | H04N 23/80 |
| 2022/0187841 A1* | 6/2022 | Ebrahimi Afrouzi | G05D 1/0274 |
| 2022/0196811 A1* | 6/2022 | Lu | G01S 7/497 |
| 2023/0347910 A1* | 11/2023 | Yu | G06V 20/588 |

FOREIGN PATENT DOCUMENTS

| | | |
|---|---|---|
| JP | 2013-237427 | 11/2013 |
| KR | 2017-0129071 | 11/2017 |
| KR | 10-2184132 | 11/2020 |
| KR | 2021-0083015 | 7/2021 |

OTHER PUBLICATIONS

English Language Abstract of DE 10-2015-012020 published May 24, 2018.

English Language Abstract of JP 2013-237427 published Nov. 28, 2013.

Korean Office Action dated May 30, 2023 issued in KR Application No. 10-2021-0163543.

English Language Abstract of KR 10-2184132 published Nov. 27, 2020.

English Language Abstract of KR 2021-0083015 published Jul. 6, 2021.

English Language Abstract of KR 2017-0129071 published Nov. 24, 2017.

Korean Notice of Allowance dated Dec. 8, 2023 issued in KR Application No. 10-2021-0163543.

\* cited by examiner

Fig.9

LAMP, METHOD FOR OPERATING THE SAME, VEHICLE

CROSS-REFERENCE TO RELATED APPLICATION

This application claims the benefit of priority to Korean Patent Application No. 10-2021-0163543, filed in the Korean Intellectual Property Office on Nov. 24, 2021, the entire contents of which are incorporated herein by reference.

TECHNICAL FIELD

The present disclosure relates to a lamp, a method for operating the same, and a vehicle.

BACKGROUND

In general, a headlamp of a vehicle is used to ensure a stable front view at night or in a tunnel, a fog condition, or a rain condition, in which a surrounding environment is dark.

Recently, as the use of a high-resolution light emitting device (LED) is enlarged, the high-resolution LED has been employed even for the headlamp of the vehicle. Accordingly, a technology and an application have been developed to project an image onto a road surface or a specific object by using the headlamp of the vehicle.

When the image is projected onto the road surface or the specific object from the headlamp of the vehicle, the projected image may be distorted depending on the road surface or the specific object. In addition, when the image is projected onto the road surface or the specific object from the headlamp of the vehicle, the projected image may be distorted, depending on the arrangement form of the vehicle.

SUMMARY

The present disclosure has been made to solve the above-mentioned problems occurring in the prior art while advantages achieved by the prior art are maintained intact.

An aspect of the present disclosure provides a lamp and a method for operating the same, capable of compensating for the distortion of an image displayed on an object.

Another aspect of the present disclosure provides a lamp and a method for operating the same, capable of compensating for the distortion of an image displayed on an object, by correcting the image.

Another aspect of the present disclosure provides a lamp and a method for operating the same, capable of compensating for the distortion of an image displayed on an object by correcting a projection angle onto the object.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a lamp may include a sensor to sense a distance to an object in front of a vehicle, a display to display an image, and a controller to compensate for distortion of the image displayed on the object, based on the distance to the object.

According to an embodiment, the controller may calculate an angle formed between the vehicle and the object, based on the distance to the object.

According to an embodiment, the controller may correct the image, based on the angle.

According to an embodiment, the controller may correct the image to be in a trapezoid shape, based on the angle.

According to an embodiment, the controller may correct the image based on the angle, such that the image is displayed on the object in a rectangular shape.

According to an embodiment, a driver to rotate the display may be further included.

According to an embodiment, the controller may control the driver such that the display projects the image onto the object perpendicularly to the object.

According to an embodiment, the controller may control the driver such that the display projects the image onto the object perpendicularly to the object, when the angle is equal to or less than the radius of rotation of the driver.

According to an embodiment, the controller may correct the image based on the angle, when the angle exceeds the radius of rotation of the driver.

According to an embodiment, the driver may rotate the display outward of the vehicle.

According to an embodiment, the sensor may include a distance sensor or a camera.

According to another aspect of the present disclosure, a method for operating a lamp may include sensing a distance to an object in front of a vehicle, compensating for distortion of an image displayed on the object, based on the distance to the object, and displaying the image.

According to an embodiment, the compensating for distortion of the image displayed on the object, based on the distance to the object may include calculating an angle formed between the vehicle and the object, based on the distance to the object.

According to an embodiment, the compensating for distortion of the image displayed on the object, based on the distance to the object may further include correcting the image based on the angle.

According to an embodiment, the compensating for distortion of the image displayed on the object, based on the distance to the object may further include performing a control operation, such that the image is projected onto the object, perpendicularly to the object.

According to an embodiment, the compensating for distortion of the image displayed on the object, based on the distance to the object may further include comparing between the angle and a radius of rotation of the driver, and correcting the image or controlling the driver, based on the comparison result.

According to another aspect of the present disclosure, a vehicle may include a first lamp, which includes a first sensor to sense a first distance to an object in front of the vehicle, a first display to display an image, and a first controller to compensate for the distortion of the image displayed on the object, based on the first distance, and a second lamp which includes a second sensor to sense a second distance to the object, a second display to display the image, and a second controller to compensate for the distortion of the image displayed on the object based on the second distance.

According to an embodiment, only one of the first lamp and the second lamp may display the image based on the first distance and the second distance.

According to an embodiment, the first controller or the second controller may calculate an angle formed between the object and the vehicle, based on the first distance and the second distance.

According to an embodiment, the first lamp may further include a first driver to rotate the first lamp, and the second lamp may further include a second driver to rotate the second lamp.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In addition, in the following description of components according to an embodiment of the present disclosure, the terms 'first', 'second', 'A', 'B', '(a)', and '(b)' may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
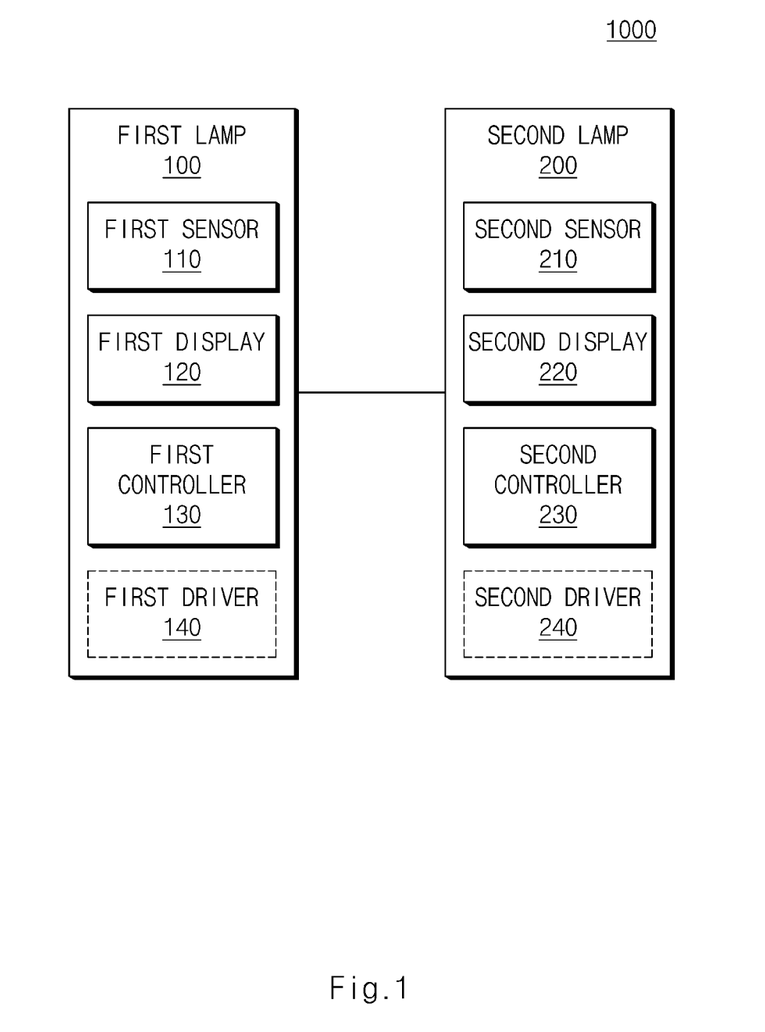
FIG. 1 is a block diagram illustrating a vehicle, according to an embodiment of the present disclosure.

FIG. 1 is a block diagram illustrating a vehicle, according to an embodiment of the present disclosure.

Referring to FIG. 1, according to an embodiment of the present disclosure, a vehicle 1000 may include a first lamp 100 and a second lamp 200. For example, the first lamp 100 may be a left lamp of the vehicle 1000, and the second lamp 200 may be a right lamp of the vehicle 1000. For another example, the first lamp 100 may be a right lamp of the vehicle 1000, and the second lamp 200 may be a left lamp of the vehicle 1000.

The first lamp 100 may include a first sensor 110, a first display 120, and a first controller 130. According to an embodiment, the first lamp 100 may further include a first driver 140.

The first sensor 110 may sense a distance (a first distance) to an object in front of the vehicle 1000. For example, the object may include a wall in front of the vehicle 1000. For another example, the first sensor 110 may include a distance sensor or a camera.

The first display 120 may display an image. For example, the first display 120 may be controlled by the first controller 130.

The first controller 130 may compensate for the distortion of the image, based on the distance (the first distance) sensed by the first sensor 110. For example, the first controller 130 may compensate for the distortion of the image by correcting the image, based on the first distance.

The first driver 140 may rotate the first lamp 100. For example, the first driver 140 may be controlled by the first controller 130.

The second lamp 200 may include a second sensor 210, a second display 220, and a second controller 230. According to an embodiment, the second lamp 200 may further include a second driver 240.

The second sensor 210 may sense a distance (a second distance) to an object in front of the vehicle 1000. For example, the object may include a wall in front of the vehicle 1000. For another example, the second sensor 210 may include a distance sensor or a camera.

The second display 220 may display an image. For example, the second display 220 may be controlled by the second controller 230.

The second controller 230 may compensate for the distortion of the image, based on the distance (the second distance) sensed by the second sensor 210. For example, the second controller 230 may compensate for the distortion of the image by correcting the image, based on the second distance.

The second driver 240 may rotate the second lamp 200. For example, the second driver 240 may be controlled by the second controller 230.

According to an embodiment, the first lamp 100 may communicate with the second lamp 200. For example, the first controller 130 and the second controller 230 may compare the first distance and the second distance to each other. In this case, only one of the first lamp 100 and the second lamp 200 may display the image, based on the first distance and the second distance. For example, when the first distance is less than or equal to the second distance, the first lamp 100 may display an image. For another example, when the first distance exceeds the second distance, the second lamp 200 may display an image.

According to an embodiment, the vehicle 1000 may further include a sensor outside the first lamp 100 and the second lamp 200. For example, the external sensor may include an ADAS sensor such as LIDAR. As another example, an external sensor may sense a 360-degree omnidirectional direction of the vehicle 1000. According to an embodiment, the external sensor may sense the inclination of the projection surface, the inclination with respect to the wall, and the inclination of the front and rear sides of the vehicle body. For example, an external sensor may measure the distance to the left and right sides of the wall, respectively, and transmit the corresponding information to other devices inside the vehicle 1000 (eg, the first lamp 100 or the second lamp 200), other devices inside the vehicle 1000 may calculate the angles inclined to the left and right with the wall.

Figure 2:
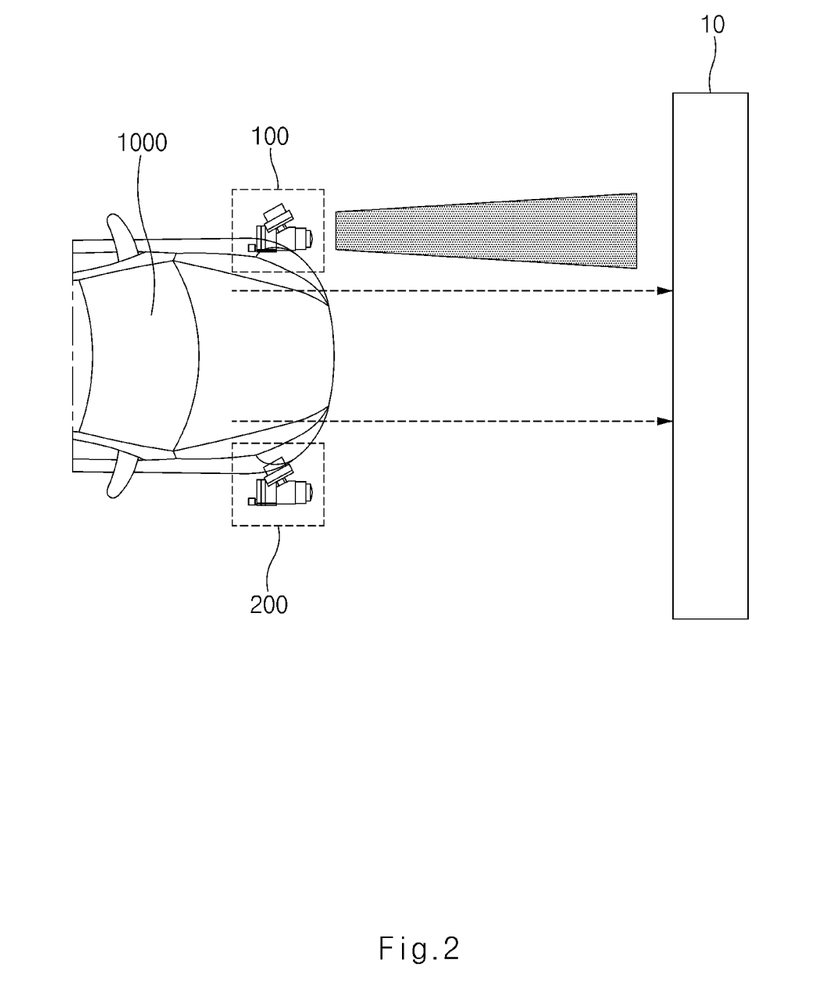
FIG. 2 is a view illustrating that a vehicle projects an image, according to an embodiment of the present disclosure.

FIG. 2 is a view illustrating that a vehicle projects an image, according to an embodiment of the present disclosure.

Referring to FIG. 2, the first lamp 100 or the second lamp 200 of the vehicle 1000 may project the image to an object 10 in front of the vehicle 1000. Although FIG. 2 illustrates that the first lamp 100 projects the image onto the object 10, the present disclosure is not limited thereto. For example, the vehicle 1000 may simultaneously project images by the first lamp 100 and the second lamp 200, or may project the image only by the second lamp 200.

The first lamp 100 and the second lamp 200 may communicate with each other and may determine one of the first lamp 100 and the second lamp 200 to project an image. For example, the vehicle 1000 may determine a lamp, which is closer to the object 10, of the first lamp 100 or the second lamp 200 to project the image.

According to an embodiment, when the distance between the first lamp 100 and the object 10 is equal to the distance between the second lamp 200 and the object 10, the vehicle 1000 may determine that the first lamp 100 projects the image. However, the present disclosure is not limited thereto. For example, the vehicle 1000 may determine the second lamp 200 to project an image, or determine the first lamp 100 and the second lamp 200 to simultaneously project images. According to an embodiment, controllers (e.g., the first controller 130 and the second controller 230 of FIG. 1) included in the first lamp 100 and the second lamp 200 may communicate with each other to determine a lamp to project an image.

Figure 3:
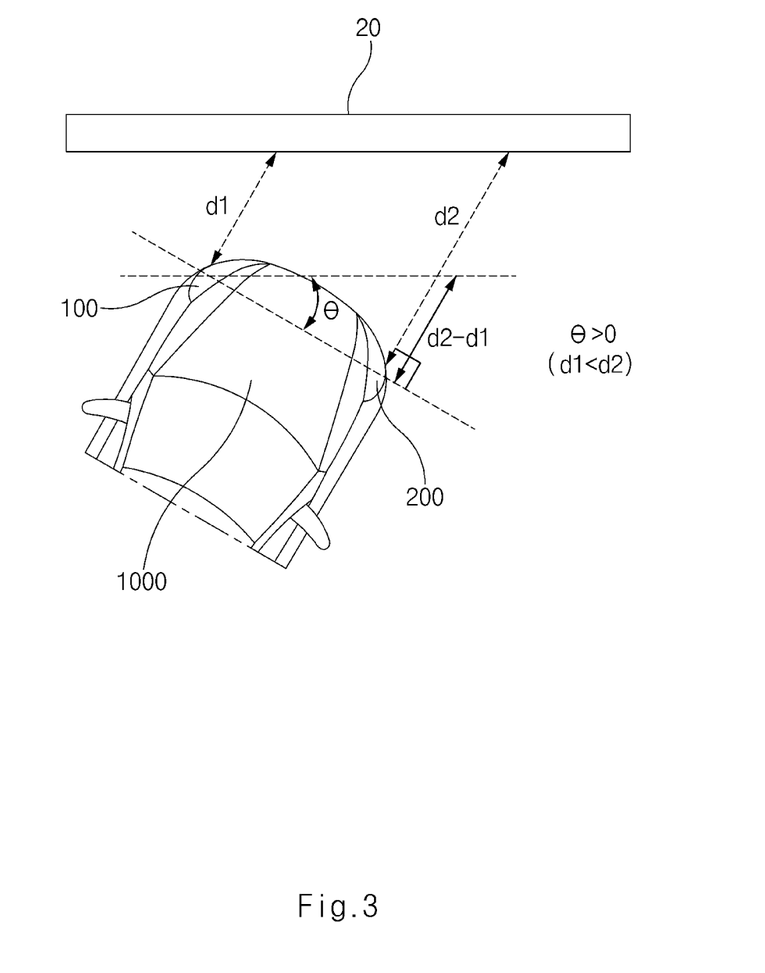
FIGS. 3 and 4 are views illustrating that a vehicle calculates an angle between the vehicle and an object, according to an embodiment of the present disclosure.
Figure 4:
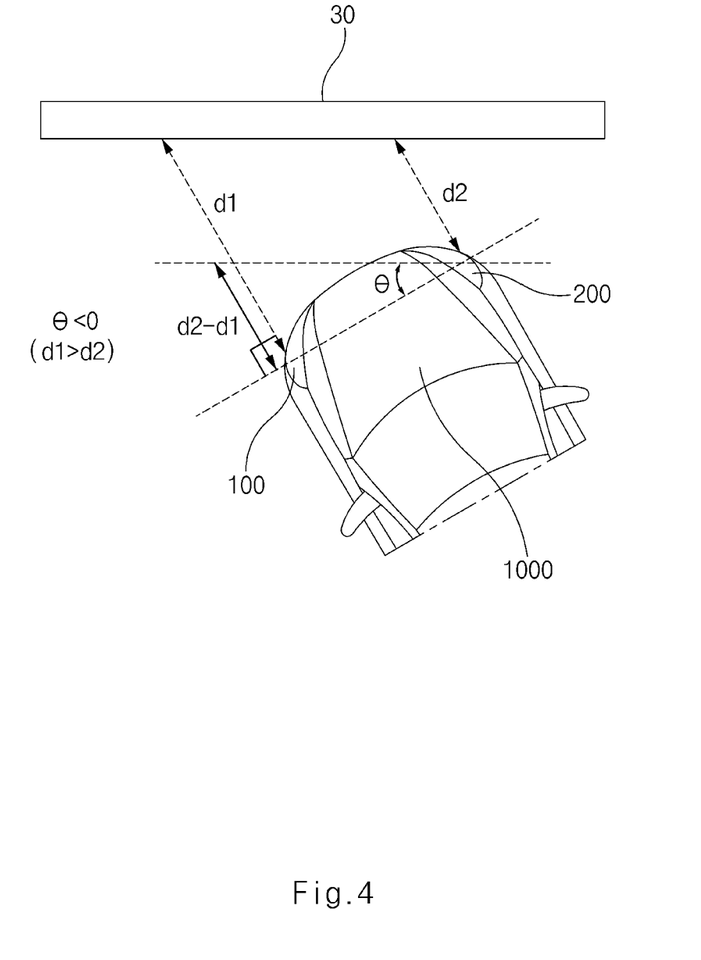

FIGS. 3 and 4 are views illustrating that a vehicle calculates an angle formed between the vehicle and an object, according to an embodiment of the present disclosure.

Referring to FIGS. 3 and 4, the first lamp 100 included in the vehicle 1000 may sense a distance 'd1' to the object 20. In addition, the second lamp 200 included in the vehicle 1000 may sense a distance 'd2' to the object 20.

The controller (e.g., the first controller 130 of FIG. 1) included in the first lamp 100 and the controller (e.g., the second controller 230 of FIG. 1) included in the second lamp 200 may communicate with each other to obtain the first distance 'd1' and the second distance 'd2'. In addition, the controller (e.g., the first controller 130 of FIG. 1) included in the first lamp 100 and the controller (e.g., the second controller 230 of FIG. 1) included in the second lamp 200 may calculate an angle '$\theta$' formed between the object 20 and the vehicle 1000.

In FIG. 3, since the second distance 'd2' is greater than the first distance 'd1', the first lamp 100 or the second lamp 200 may calculate a value 'd2−d1' obtained by subtracting the first distance 'd1' from the second distance 'd2', and may calculate the angle '$\theta$' formed between the vehicle 1000 and the object 20 through a trigonometrical function, based on the distance between the first lamp 100 and the second lamp 200. In this case, since the value 'd2−d1' is a positive value, the angle '$\theta$' represents a positive value.

In FIG. 4, the first lamp 100 or the second lamp 200 may calculate a value 'd2−d1' obtained by subtracting the first distance 'd1' from the second distance 'd2', and may calculate the angle '$\theta$' formed between the vehicle 1000 and the object 30 through a trigonometrical function, based on the distance between the first lamp 100 and the second lamp 200. In this case, since the value 'd2−d1' is a negative value, the angle '$\theta$' represents a negative value.

Figure 5:
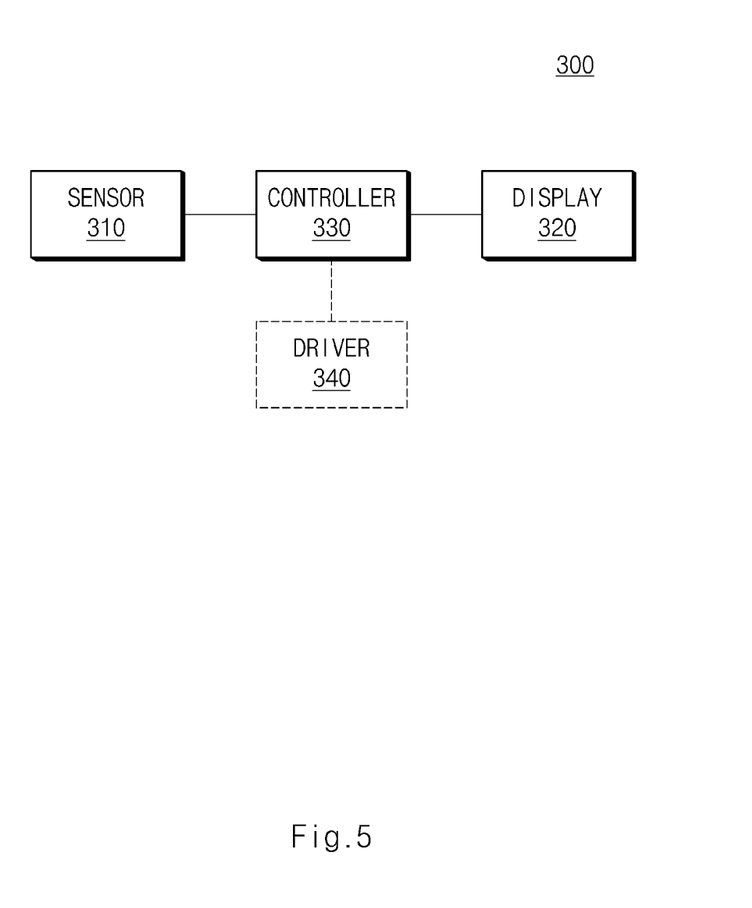
FIG. 5 is a block diagram illustrating a lamp, according to an embodiment of the present disclosure.

FIG. 5 is a block diagram illustrating a lamp, according to an embodiment of the present disclosure.

Referring to FIG. 5, according to an embodiment of the present disclosure, a lamp 300 may include a sensor 310, a display 320, and a controller 330. According to an embodiment, the lamp 300 may further include a driver 340. According to an embodiment, the lamp 300 may be substantially the same as the first lamp 100 or the second lamp 200 of FIG. 1. In other words, the sensor 310 may be substantially the same as the first sensor 110 or the second sensor 210, and the display 320 may be substantially the same as the first display 120 or the second display 220. In addition, the controller 330 may be substantially the same as the first controller 130 or the second controller 230, and the driver 340 may be substantially the same as the first driver 140 or the second driver 240.

The sensor 310 may sense a distance to an object in front of the vehicle. For example, the object may include a wall surface. For another example, the sensor 310 may include a distance sensor or a camera. For another example, the distance sensor may include at least one of a light detection and ranging (LIDAR) sensor, a radar sensor, an infrared ray (IR) sensor, or a time of flight (ToF) sensor. The sensor 310 may transmit the sensed distance information to the controller 330.

The display 320 may display an image. For example, the display 320 may include a high-resolution LED. For example, the display 320 may be controlled by the controller 330. For another example, the image may include an image processed by the controller 330.

The controller 330 may compensate for the distortion of the image displayed on the object, based on the distance sensed by the sensor 310. For example, the controller 330 may compensate for the distortion of the image by correcting the image.

The controller 330 may calculate an angle formed between the vehicle and the object, based on the distance to the object. For example, the controller 330 may calculate the angle formed between the vehicle and the object, through the method as illustrated in FIG. 3 or FIG. 4.

The controller 330 may correct the image, based on the calculated angle. For example, the controller 330 may correct the image to be in a trapezoidal shape, based on the angle. According to an embodiment, the controller 330 may correct the image, based on the angle, such that the image is displayed on the object in a rectangular shape.

Figure 6:
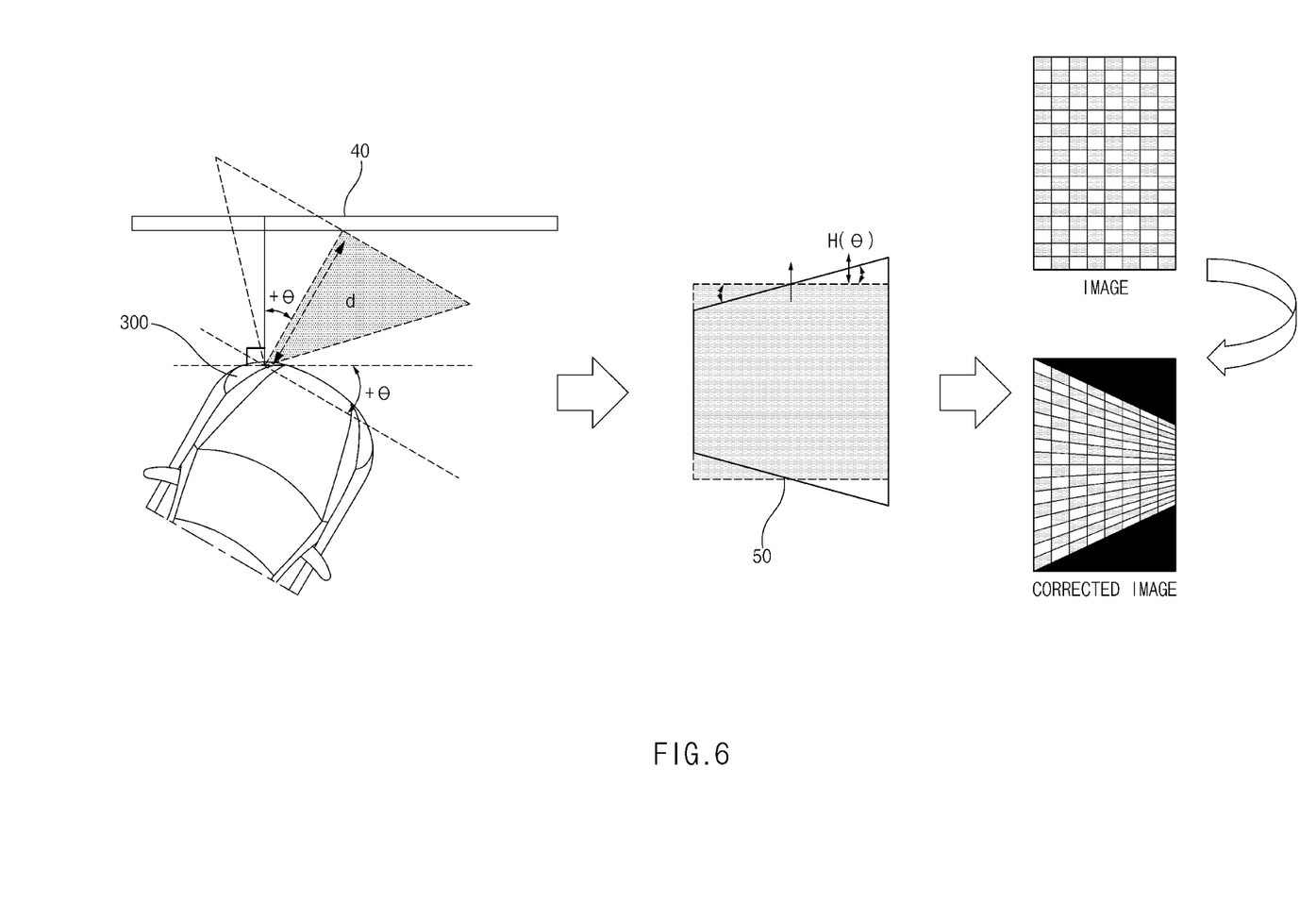
FIG. 6 is a view illustrating that a lamp corrects an image, according to an embodiment of the present disclosure.

FIG. 6 is a view illustrating that a lamp corrects an image, according to an embodiment of the present disclosure. The lamp 300 illustrated in FIG. 6 may be substantially the same as the lamp 300 of FIG. 5.

Referring to FIG. 6, the lamp 300 may calculate an angle '$\theta$' formed between the vehicle and an object 40, based on a distance 'd' between the vehicle and the object 40. For example, the controller 330 included in the lamp 300 may calculate the angle '$\theta$' formed between the vehicle and the object 40.

The controller 330 may calculate an area 50, on which an image is displayed, based on the angle '$\theta$' formed between the vehicle and the object 40. For example, the area 50, on which the image is displayed, may be calculated through a function 'H($\theta$)', based on the angle '$\theta$' formed between the vehicle and the object 40.

The controller 330 may correct the image, based on the shape of the area 50 in which the image is displayed. For example, the controller 330 may correct the image to be in the same shape as the shape of the area 50 in which the image is displayed. For another example, when the image is displayed on the area 50, the controller 330 may correct the image to be displayed in a rectangular shape. For another example, the controller 330 may correct the image to be in a trapezoidal shape, based on the angle 'θ' or the function 'H(θ)'.

According to an embodiment, the controller 330 may display the corrected image on the object 40 through the display 320, and may display the image without distortion.

Referring back to FIG. 5, according to an embodiment of the present disclosure, the lamp 300 may further include the driver 340. For example, the driver 340 may rotate the display 320.

The controller 330 may control the driver 340. For example, the controller 330 may control the driver 340 such that the display 320 projects an image onto the object, perpendicularly to the object.

The controller 330 may obtain a radius of rotation of the driver 340 in advance. The controller 330 may compare the radius of rotation of the driver 340 with the angle formed between the vehicle and the object. For example, when the angle formed between the vehicle and the object is less than or equal to the radius of rotation of the driver 340, the controller 330 may control the driver 340, such that the display 320 projects the image onto the object, perpendicularly to the object. For another example, when the angle between the vehicle and the object exceeds the radius of rotation of the driver 340, the controller 330 may correct the image, based on the angle and may control the display 320 to output the corrected image.

According to an embodiment, the driver 340 may rotate the display 320 outward of the vehicle. For example, when the driver 340 rotates the display 320 inward of the vehicle, the diver 340 may collide with another device inside the vehicle. Accordingly, the diver 340 may rotate the display 320 outward of the vehicle. In other words, when the driver 340 needs to rotate the display 320 inward of the vehicle, such that the display 320 projects the image onto the object, perpendicularly to the object, the controller 330 may perform a control operation of correcting the image and outputting the image through the display 320, without controlling with the driver 340.

Figure 7:
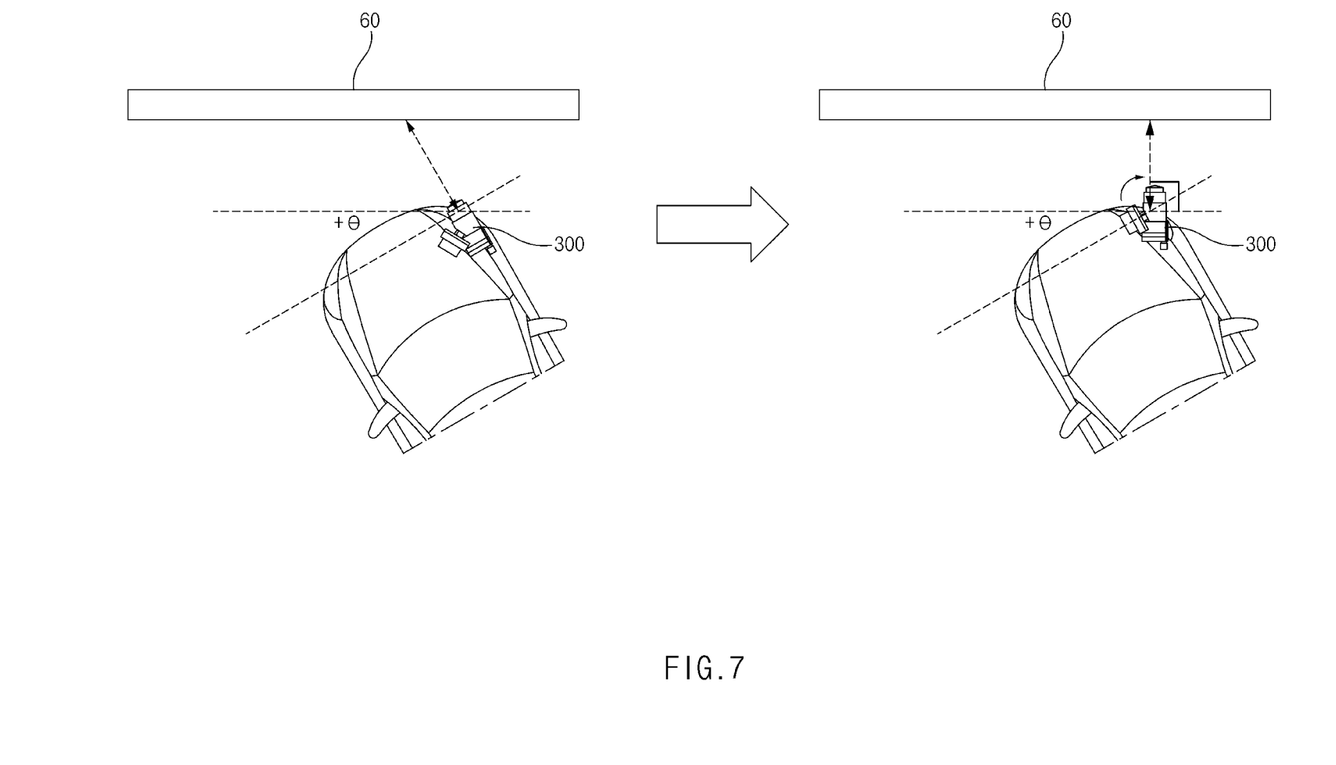
FIG. 7 is a view illustrating that a lamp adjusts a protection angle of an image, according to an embodiment of the present disclosure.

FIG. 7 is a view illustrating that a lamp adjusts a protection angle of an image, according to an embodiment of the present disclosure. The lamp 300 illustrated in FIG. 7 may be substantially the same as the lamp 300 illustrated FIG. 5.

Referring to FIG. 7, according to an embodiment of the present disclosure, the controller 330 included in the lamp 300 may calculate the angle formed between the vehicle and the object 60, and may control the driver 340, based on the calculated angle 'θ', such that the display 320 projects the image onto the object 60, perpendicularly to the object 60.

According to an embodiment, the driver 340 may rotate the display 320 outward of the vehicle (in the direction illustrated in FIG. 7). For example, when the driver 340 needs to rotate the display 320 inward of the vehicle, such that the display 320 projects the image onto the object, perpendicularly to the object, the controller 330 may perform a control operation of correcting the image and outputting the image through the display 320, without controlling with the driver 340.

According to an embodiment of the present disclosure, the lamp 300 may compensate for the distortion of the image displayed on the object, based on the distance to the object.

According to an embodiment of the present disclosure, the lamp 300 may compensate for the distortion of the image displayed on the object, by correcting the image.

According to an embodiment of the present disclosure, the lamp 300 may compensate for the distortion of the image displayed on the object, by adjusting the projection angle of the image.

According to an embodiment of the present disclosure, the lamp 300 may compensate for the distortion of the image displayed on the object by determining whether to correct the image, or whether to rotate the lamp, based on the radius of rotation of the lamp.

Figure 8:
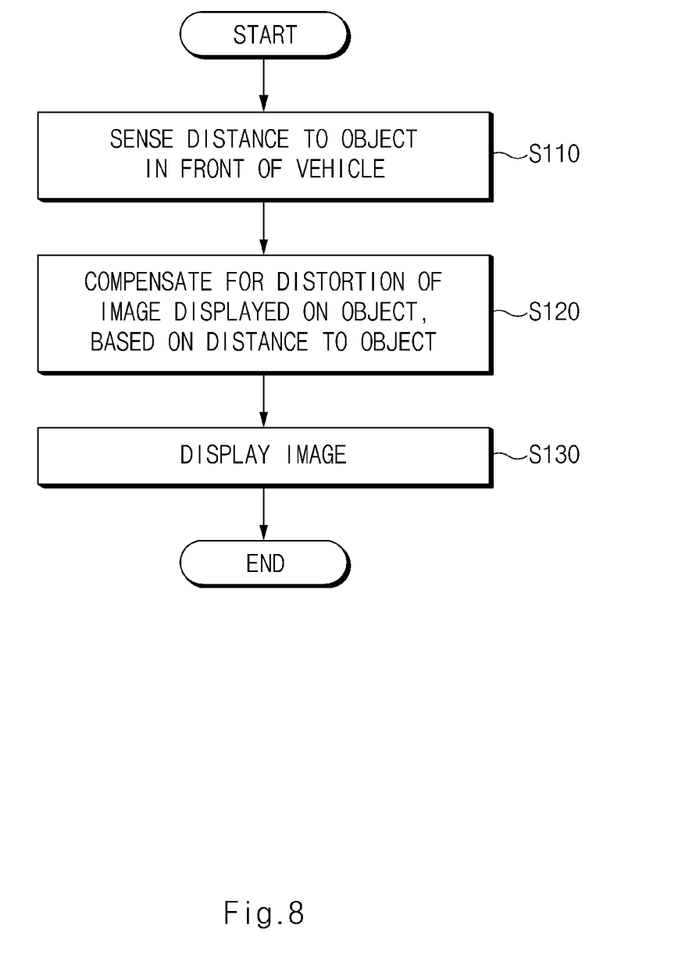
FIG. 8 is a flowchart illustrating a method for operating a lamp, according to an embodiment of the present disclosure.

FIG. 8 is a flowchart illustrating a method for operating a lamp, according to an embodiment of the present disclosure. The operations illustrated in FIG. 8 may be performed through the lamp 300 of FIG. 5.

Referring to FIG. 8, according to an embodiment of the present disclosure, a method for operating the lamp 300 may include sensing a distance to an object in front of a vehicle (S110), compensating for distortion of the image displayed on the object, based on the distance to the object (S120), and display the image (S130).

In the sensing of the distance to the object in front of the vehicle (S110), the sensor 310 may sense the distance to the object in front of the vehicle. For example, the sensor 310 may include at least one of a LIDAR sensor, a radar sensor, an IR sensor, or a ToF sensor.

In the compensating for the distortion of the image displayed on the object, based on the distance to the object (S120), the controller 330 may compensate for the distortion of the image displayed on the object, based on the distance to the object. For example, the controller 330 may compensate for the distortion of the image, which is displayed on the object, by correcting the image, based on the distance to the object. For another example, the controller 330 may compensate for the distortion of the image displayed on the object, by controlling the driver 340, based on the distance to the object to rotate the display 320.

In the displaying of the image (S130), the display 320 may display the image. For example, the display 320 may display the corrected image through the controller 330. For another example, when the driver 340 rotates the display 320, the display 320 may output the image without correcting the image. According to an embodiment, when the image is corrected through the controller 330, or when the display 320 projects the image onto the object, perpendicularly to the object through the driver 340, the display 320 may display the image, which is not distorted, on the object.

Figure 9:
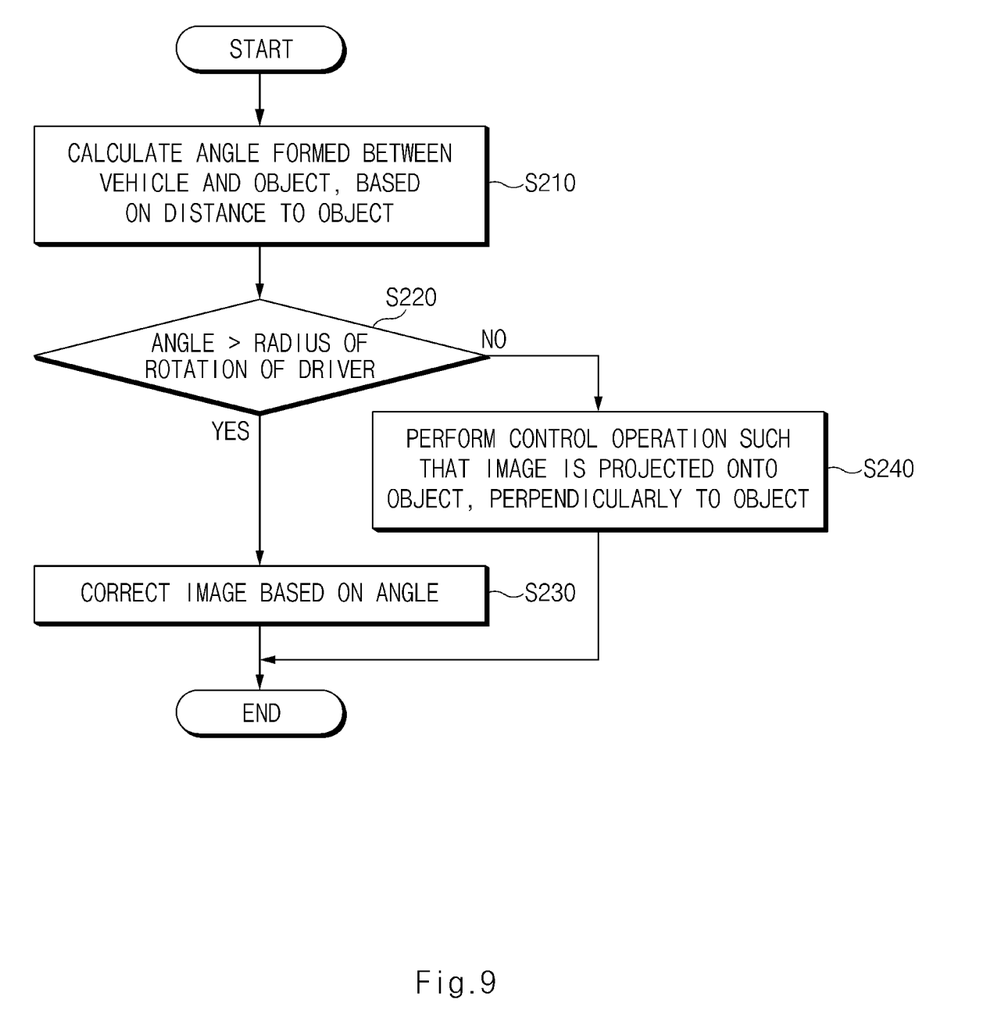
FIG. 9 is a flowchart illustrating a method for operating a lamp, according to an embodiment of the present disclosure.

FIG. 9 is a flowchart illustrating a method for operating a lamp, according to an embodiment of the present disclosure.

Referring to FIG. 9, according to an embodiment of the present disclosure, a method for operating the lamp 300 may include calculating an angle formed between a vehicle and an object, based on the distance to the object (S210), comparing the angle with the radius of rotation of the driver (S220), correcting an image, based on the angle (S230), and performing a control operation such that the image is projected onto the object, perpendicularly to the object (S240). According to an embodiment, S210 to S240 may include S120 of FIG. 8.

In the calculating of the angle formed between the vehicle and the object, based on the distance to the object (S210), the controller 330 may calculate the angle between the vehicle and the object, based on the distance to the object. For example, the controller 330 may calculate the angle formed between the vehicle and the object, through the method as illustrated in FIG. 3 or FIG. 4.

In the comparing of the angle with the radius of rotation of the driver (S220), the controller 330 may compare the calculated angle with the radius of rotation of the driver 340. For example, the controller 330 may obtain the radius of rotation of the driver 340 in advance. For another example, the controller 330 may perform S230 or S240, based on the comparison result between the calculated angle and the radius of rotation of the driver 340.

When the calculated angle exceeds the radius of rotation of the driver 340, the controller 330 may correct the image, based on the calculated angle, in the correcting of the image, based on the angle (S230). For example, the controller 330 may correct the image to be in a trapezoidal shape, based on the angle. According to an embodiment, the controller 330 may correct the image, based on the angle, such that the image is displayed on the object in a rectangular shape.

When the calculated angle is equal to or less than the radius of rotation of the driver 340, the controller 330 may control the driver 340 such that the image is projected onto the object, perpendicularly to the object, in the performing of the control operation such that the image is projected onto the object, perpendicularly to the object (S240). For example, the driver 340 may rotate the display 320 such that the display 320 projects the image onto the object, perpendicularly to the object.

According to an embodiment of the present disclosure, in the method of operating the lamp 300, the radius of rotation of the driver 340 may be compared with the angle between the vehicle and the object. The image may be corrected or whether the display 320 is rotated may be determined, based on the comparison result.

As described above, according to an embodiment of the present disclosure, in the lamp and the method for operating the same, the distortion of the image displayed on the object may be compensated for, based on the distance to the object.

According to an embodiment of the present disclosure, in the lamp and the method for operating the same, the distortion of the image displayed on the object may be compensated for by correcting the image.

According to an embodiment of the present disclosure, in the lamp and the method for operating the same, the distortion of the image displayed on the object may be compensated for by adjusting a projection angle to the image.

According to an embodiment of the present disclosure, in the lamp and the method for operating the same, the distortion of the image displayed on the object may be compensated for, by determining whether to correct the image, or whether to rotate the lamp, based on the radius of rotation of the lamp.

Besides, a variety of effects directly or indirectly understood through the disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the disclosure claimed in the following claims.

Therefore, the embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A lamp device comprising:
a sensor for sensing a distance to an object in front of a vehicle;
a display for projecting an image on the object;
a controller comprising hardware circuitry for generating a compensated image by compensating for distortion of the image projected on the object based on the distance to the object, and projecting the compensated image on the object; and
a driver for rotating the display,
wherein the controller is configured to:
calculate an angle formed between the vehicle and the object based on the distance to the object; and
control the driver such that the display projects the image onto the object perpendicularly to the object when the angle is equal to or less than a radius of rotation of the driver.

2. The lamp device of claim 1, wherein the controller is configured to: correct the image based on the angle.

3. The lamp device of claim 1, wherein the controller is configured to: correct the image to be in a trapezoid shape based on the angle.

4. The lamp device of claim 1, wherein the controller is configured to: correct the image based on the angle such that the image is projected on the object in a rectangular shape.

5. The lamp device of claim 1, wherein the controller is configured to: control the driver such that the display projects the image onto the object perpendicularly to the object.

6. A lamp device comprising:
a sensor for sensing a distance to an object in front of a vehicle;
a display for projecting an image on the object;
a controller comprising hardware circuitry for generating a compensated image by compensating for distortion of the image projected on the object based on the distance to the object, and projecting the compensated image on the object; and
a driver for rotating the display,
wherein the controller is configured to:
calculate an angle formed between the vehicle and the object based on the distance to the object; and
correct the image based on the angle when the angle exceeds a radius of rotation of the driver.

7. The lamp device of claim 1, wherein the driver rotates the display outward of the vehicle.

8. The lamp device of claim 1, wherein the sensor includes:
a distance sensor or a camera.

9. A method for operating a lamp device, the method comprising:
sensing a distance to an object in front of a vehicle;
generating a compensated image by compensating for distortion of an image projected on the object based on the distance to the object; and
projecting the compensated image on the object,
wherein compensating for distortion of the image includes:
calculating an angle formed between the vehicle and the object based on the distance to the object,
comparing the angle and a radius of rotation of a driver; and
correcting the image or controlling the driver, based on a result of the comparing.

10. The method of claim 9, wherein compensating for distortion of the image further includes:
   correcting the image based on the angle.

11. The method of claim 9, wherein compensating for distortion of the image projected on the object further includes:
   performing a control operation such that the image is projected onto the object perpendicularly to the object.

\* \* \* \* \*